Sept. 1, 1970　　　　　HIROSHI MIZUKOSHI　　　　3,526,776
PHOTOELECTRIC DETECTING DEVICE FOR WEFT
IN SHUTTLE UNDER OPERATION
Filed Nov. 30, 1966
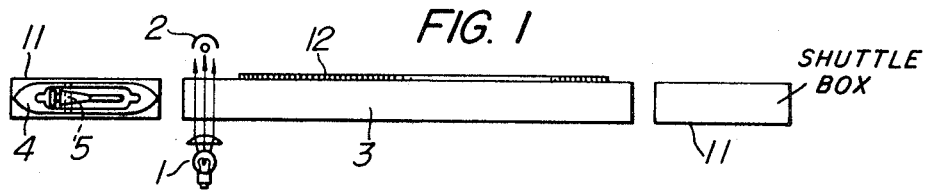
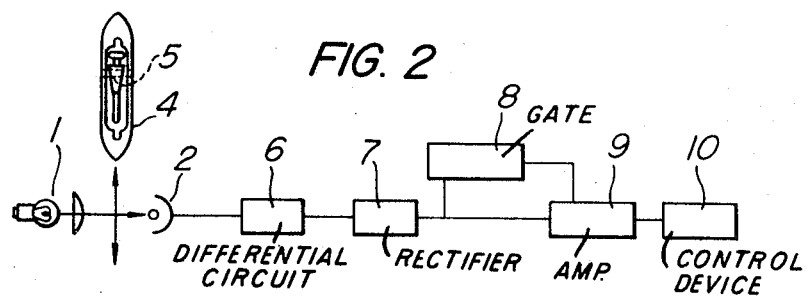
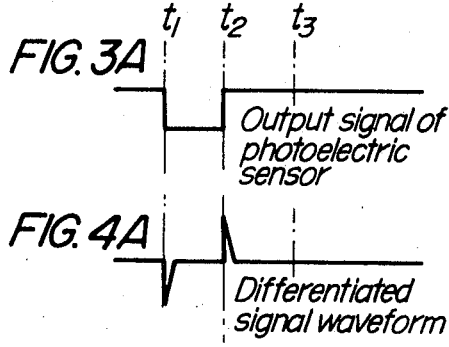
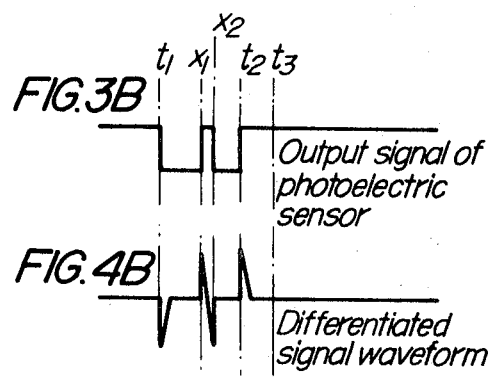
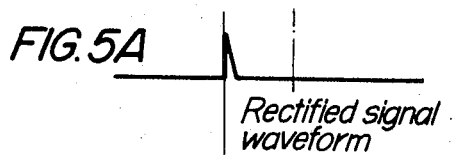
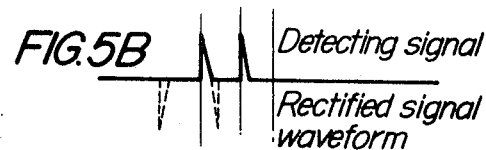
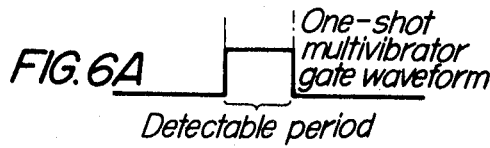
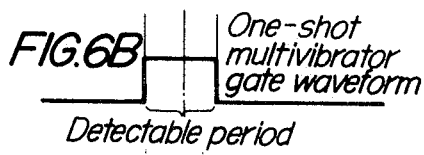
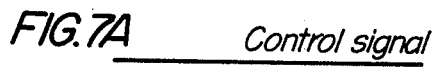
INVENTOR
HIROSHI MIZUKOSHI
BY　Paul M. Craig, Jr.
ATTORNEY United States Patent Office
3,526,776
Patented Sept. 1, 1970

1

3,526,776
PHOTOELECTRIC DETECTING DEVICE FOR
WEFT IN SHUTTLE UNDER OPERATION
Hiroshi Mizukoshi, 15 Hamadacho-1-chome, Minami-ku,
Nagoya, Japan
Filed Nov. 30, 1966, Ser. No. 597,915
Int. Cl. G06m 7/00
U.S. Cl. 250—222          2 Claims

ABSTRACT OF THE DISCLOSURE

A photoelectric detecting device of the penetrating ray type for weft in a shuttle under operation in a loom comprising a single photoelectric sensor placed opposite to a lamp across the race of the shuttle interposed therebetween, differentiating and rectifying circuits for producing a pulsed signal whenever an input to said sensor changes from dark to light by (i) light passing through a hole in the shuttle on exhaustion of the weft and (ii) by the shuttle uncovering the sensor, a gate circuit for making an ampilfier operable for a predetermined period of time upon receipt of the first of said pulsed signals, said amplifier being adapted to produce a control signal to activate a control device for the loom when it receives a pulsed signal produced by the shuttle uncovering the sensor, provided the gate circuit previously has been triggered by a pulsed signal produced by light passing through the hole in the shuttle.

---

This invention relates to a photoelectric detecting device for the weft in the shuttle of a loom under operation.

Generally in conventional photoelectric detection systems, available heretofore, the decrease in quantity of weft has been detected by measuring changes in reflected rays or penetrating rays in order to control the loom.

When the reflected ray type detecting device is employed, a suitable reflector is mounted on the tongue of a wooden pipe type loom or in any other appropriate location. Decrease in the quantity of the weft results in a change in the reflected ray from the reflector. However, there are many possibilities of erroneous operation of the device owing to deterioration or contamination of the reflector resulting in lowering the reflection factor of the body, or difference in color and gloss of the weft. Whereas, in case of devices employing penetrating rays, there is no such disadvantage as described above with reference to the reflected ray type control device, however, an extra device such as a mechanical shutter, electrical switching device or optical filter is required. This extra control device is used to control the weft detection device so that the detecting operation can be carried out only in a predetermined period of time, that is, only during the passing of the shuttle through the ray. Also, the additional control device must be operated in synchronism with the rotation of the loom, and hence requires care in the adjustment of the device.

The photoelectric weft detecting device according to the present invention is characterized by a penetrating ray type weft detecting device comprising a single photoelectric sensor placed opposite to a lamp so that the rays from the lamp crosses the race of the shuttle to the photoelectric sensor. The control signal obtained from the photoelectric sensor is supplied to a wave shaping circuit means comprised by a differentiating and rectifying circuit for producing a pulsed signal whenever an input to the sensor changes from dark to light by (i) light passing through a hole in the shuttle on exhaustion of the weft and (ii) by the shuttle uncovering the sensor. The pulsed output from the differentiating and rectifying circuits is supplied to a gate pulse producing means for making a gated amplifier operable for a predetermined period of time upon receipt of the first of the pulsed signals. The amplifier is adapted to produce a control signal to activate a control device for the loom when it receives the second of the pulsed signals produced by the shuttle uncovering the sensor, provided the gate pulse producing means has been triggered by the pulsed signal produced by light passing through the hole in the shuttle.

An embodiment of the present invention will now be described by way of example with reference to the accompanying drawings, in which:

FIG. 1 is a functional block diagram of one embodiment of the invention.

FIG. 2 is a simplified schematic block diagram of an electrical circuit of the device.

FIG. 3A through FIG. 7A show waveforms of correspondingly timed signals obtained when the quantity of weft is sufficient.

FIGS. 3B through 7B show the waveforms of resultant correspondingly timed signals obtained when the weft has been used up.

FIG. 3 shows the waveform of the signal produced at the photoelectric sensor output.

FIG. 4 shows the same signal waveform after passing through the differentiation circuit.

FIG. 5 shows the waveform of the said signal after passing through the rectifier circuit.

FIG. 6 shows the waveform of the input signal applied to the gate circuit by which the amplifier is made operable.

FIG. 7 is the waveform of the signal by which the control device is activated.

Referring to FIG. 1 and FIG. 2, a lamp 1 and a photoelectric sensor 2 are placed opposite to each other so that the race 3 of a shuttle 4 is positioned between them. A through-hole 5 is provided in the shuttle 4 and its constituent part comprised by the (wooden pipe tongue) so that rays from the lamp 1 can penetrate through this hole 5 when the weft is used up or the quantity of the weft decreases to a preset minimum. A gated amplifier 9 controlled by a group of electrical circuits comprising a waveform shaping circuit such a a differentiation circuit 6 and a rectifier circuit 7, and a gate circuit 8 such as a one-shot multivibrator, is made operable for a predetermined period of time upon receipt of a signal pulse. If a signal pulse is applied to the amplifier from rectifier 7 doing the time in which the amplifier 9 is supplied a gating enabling pulse from the gate pulse producing circuit 8, the control device 10 is activated. A shuttle box is shown at 11 and 12 shows a reed.

When the shuttle containing the weft passes in front of the lamp, the photoelectric sensor 2 produces a signal as shown in FIG. 3A where $(t_1-t_2)$ represents the time in which the shuttle covers the light. This signal is changed into that shown in FIG. 4A by passing through the differentiation circuit 6. It is then rectified and becomes a pulse shown in FIG. 5a. Since the amplifier 9 is inoperoperable, due to the absence of an enabling pulse from gate pulse producing circuit 8 no control signal can be produced even if the pulse signal from the rectifier is applied to the gate circuit 8 and then to the amplifier 9 (see FIG. 7A). The gate circuit 8 opens as shown in FIG. 6A for a predetermined period of time $t_2-t_3$, thus making the amplifier 9 operable. In the period of $t_2-t_3$ that the amplifier 9 is operable, the weft detection operation can be carried out. It should be, therefore, noted that the signal produced by passing the shuttle across the path of the rays from the lamp functions only to produce an enabling output pulse from gate pulse producing circuit 8 make the amplifier 9 operable, but no control signal is produced.

In conventional penetrating ray type weft detection system used so far, an auxiliary control device such as a mechanical shutter, electrical switching device or optical filter is required to suppress the production of the control signal. According to the present invention, this undesired control signal is utilized as a selecting or enabling signal.

When the weft is used up and the ray penetrates through the hole, a signal $x_1$–$x_2$ as shown in FIG. 3B is produced at the output of the photoelectric sensor for a fixed period of time $t_1$–$t_2$ which is called the screened time of the shuttle. This signal is then applied to the waveform shaping circuit and changed into two pulses at $x_1$ and $t_2$ as shown in FIG. 5B. The first pulse $x_1$ functions to make the amplifier 9 operable by producing an output enabling pulse from gate pulse producing circuit 8 as previously described. Since the second pulse $t_2$ is produced the duration of the pulse $x_1$–$t_3$ of FIG. 6B during which the gated amplifier 9 is enabled and hence the weft system is operable, the control device is activated upon receipt of the second pulse $t_2$ and controls the loom.

The control device is activated within the duration of $t_2$–$t_4$ of FIG. 7B.

Although the photoelectric weft detecting device according to the present invention is of the penetrating ray type as described above, it is capable of detecting the presence of weft without using any auxiliary device such as a mechanical shutter, electrical switching device or optical filter. This makes it possible to provide ease of maintenance and trouble-free operations.

What is claimed is:

1. A photoelectric detecting device of the penetrating ray type for weft in a shuttle under operation in a loom comprising a photoelectric sensor placed opposite to a lamp across the race of the shuttle interposed therebetween, waveshaping circuit means for producing a pulsed output signal whenever an input to said sensor changes from dark to light by (i) light passing through a hole in the shuttle on exhaustion of the weft and (ii) by the shuttle uncovering the sensor, gate pulse producing means responsive to said waveshaping circuit means for producing an output gating pulse for a predetermined period of time in response to a pulsed input signal from said waveshaping circuit means, and gated amplifier circuit means responsive to the output from said waveshaping circuit means and said gate pulse producing means, said gated amplifier circuit means being rendered operable for a predetermined period of time upon receipt of an input gating pulse from said gate pulse producing means and being adapted to produce a control signal to activate a control device for the loom upon receiving a second pulsed signal from said waveshaping circuit means produced by the shuttle uncovering the sensor, provided the gate pulse producing means previously has been triggered by a prior pulsed signal produced by light passing through the hole in the shuttle.

2. A photoelectric detecting device according to claim 1 wherein the waveshaping circuit means comprises a differentiator circuit having its input coupled to the output from the photoelectric sensor and a rectifier circuit having its input coupled to the output from the differentiator circuit and its output connected to the input of the gate pulse producing means and to an input of the gated amplifier circuit means.

References Cited

UNITED STATES PATENTS 3,235,741  2/1966  Plaisance _____ 250—229

ARCHIE R. BORCHELT, Primary Examiner

M. ABRAMSON, Assistant Examiner

U.S. Cl. X.R.

250—229, 231